Feb. 6, 1962   H. B. WHITEHURST ET AL   3,019,515
METAL COATED GLASS FIBERS
Original Filed Nov. 10, 1953

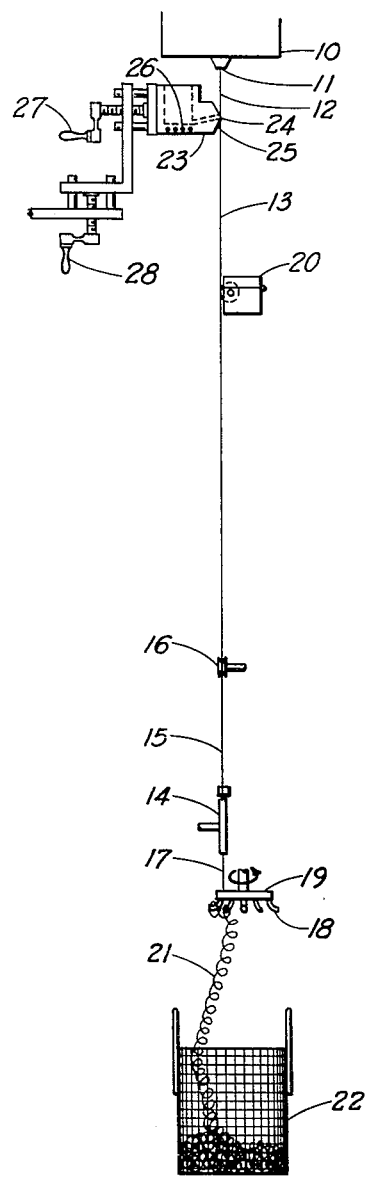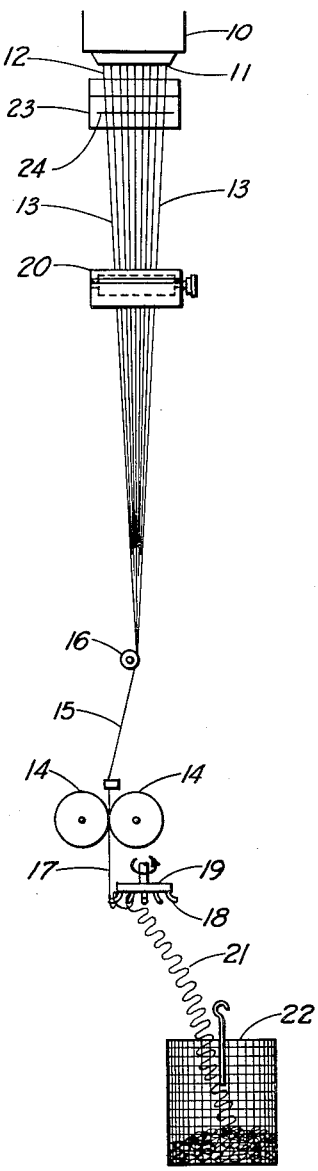
Fig. 1
Fig. 2

INVENTORS
HARRY B. WHITEHURST & WILLIAM H. OTTO
BY
ATTORNEYS

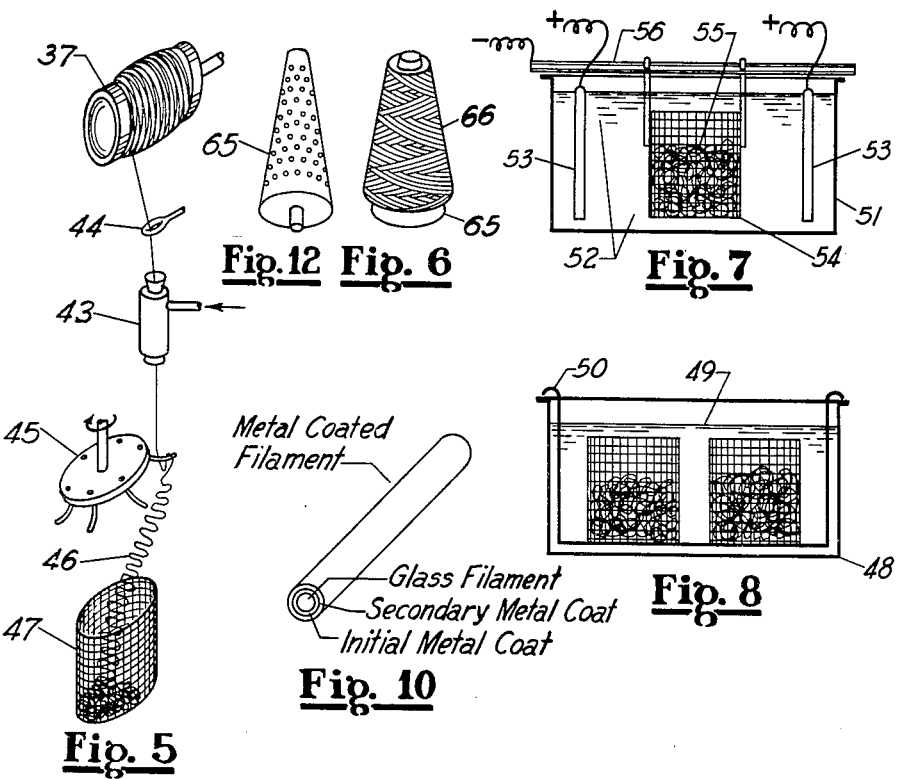
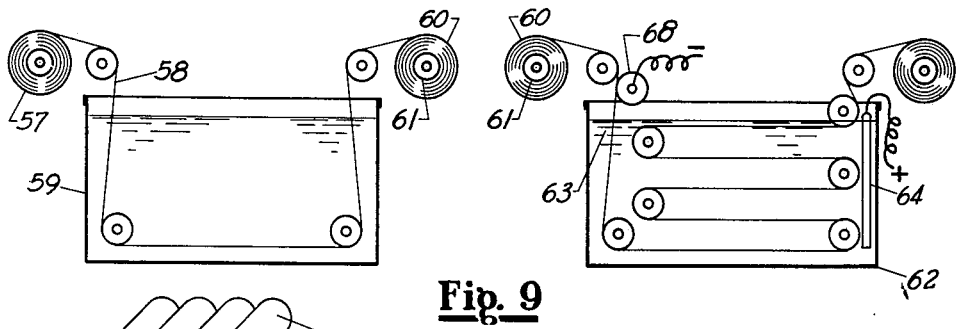
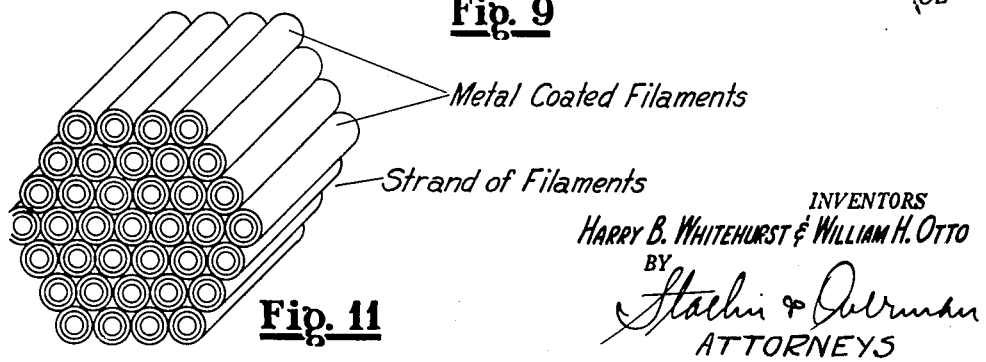

United States Patent Office 3,019,515
Patented Feb. 6, 1962

3,019,515
METAL COATED GLASS FIBERS
Harry B. Whitehurst and William H. Otto, Newark, Ohio, assignors to Owens-Corning Fiberglas Corporation, a corporation of Delaware
Original application Nov. 10, 1953, Ser. No. 391,184, now Patent No. 2,848,390, dated Aug. 19, 1958. Divided and this application Nov. 21, 1957, Ser. No. 697,895
5 Claims. (Cl. 29—195)

This is a division of our copending application having Serial Number 391,184, filed on November 10, 1953, now U.S. Patent 2,848,390.

This invention relates to metal coating of glass and particularly to the application of one or more metal coats to glass in the massive or fibrous form.

Glass in the massive form has many advantageous physical properties including hardness, transparency, translucency, resistance to weathering and the like and glass in the fibrous form has great tensile strength, flexibility and other properties which make it possible to use fibrous glass in many widespread applications. The physical properties of glass in either massive or fibrous form are enhanced by coating the glass with suitable materials including metals or alloys of metals. In the past it has been found that the strength properties of fibrous glass have been deleteriously affected by certain of the metallizing processes which were attempted. For instance, when applying metal in the molten form and especially when applying high melting point metals to glass in any form which has a total mass that is small as compared to the total surface area as in glass fibers, the strength of the glass has been reduced due to the deleterious effects of reheating the glass. This unfortunately is true although some of the higher melting point metals such as chromium and the like have physical properties which should enhance the properties of glass in fibrous form.

It is an object of this invention to provide metallic coatings for glass in order to enhance the physical properties of the glass.

It is a further object to coat glass with metals or alloys of metals in any desired thickness using methods which do not entail use of high temperatures.

It is also an object to provide coatings of one or more of a great number of metals or alloys to glass which is in a form having a low mass to surface area ratio without deleteriously affecting the physical properties of the glass.

It is an object to provide coatings comprising combinations of metals on glass in the fibrous form.

The objects of this invention are achieved by utilizing electrochemical methods for applying metal or alloys of metal to an electroconductive surface of glass in massive or fibrous form which may or may not have an initial coat of a metal and, if desired, applying second or subsequent coatings of like or dissimilar metals or alloys by immersion or electroplating techniques. Metal as used herein shall include any alloys of the metal, i.e., zinc and alloys of zinc including such alloys as 97:3 zinc-aluminum alloy and the like.

In the drawings:

FIGURE 1 is a side elevational view of apparatus for forming continuous metal coated glass filaments in accordance with one embodiment of the invention;

FIGURE 2 is a front elevational view of the apparatus of FIGURE 1;

FIGURE 5 is a view of apparatus used to form a loose package of continuous material from the tube package formed with the apparatus of FIGURES 3 and 4;

FIGURE 6 shows a thin, loosely wound package formed with suitable textile apparatus, which package is adapted for metallizing treatments according to the invention;

FIGURE 7 is a partly schematic view showing an electroplating tank for applying a metal coat to a loose package of fibrous glass;

FIGURE 8 is a partly schematic view of an immersion tank for applying a metal lower in the electromotive series upon fibrous glass already having a metal or a salt of a metal thereon;

FIGURE 9 shows apparatus for applying metal electrochemically directly to a fibrous glass surface;

FIGURE 10 is an enlarged view of a filament of glass having both an undercoat and an overcoat of metal;

FIGURE 11 is an enlarged view representing a strand comprising a plurality of fibers treated according to this invention; and FIGURE 12 is a view of a perforated spool upon which a package of fibrous material is wrapped for electroplating.

Figure 3:
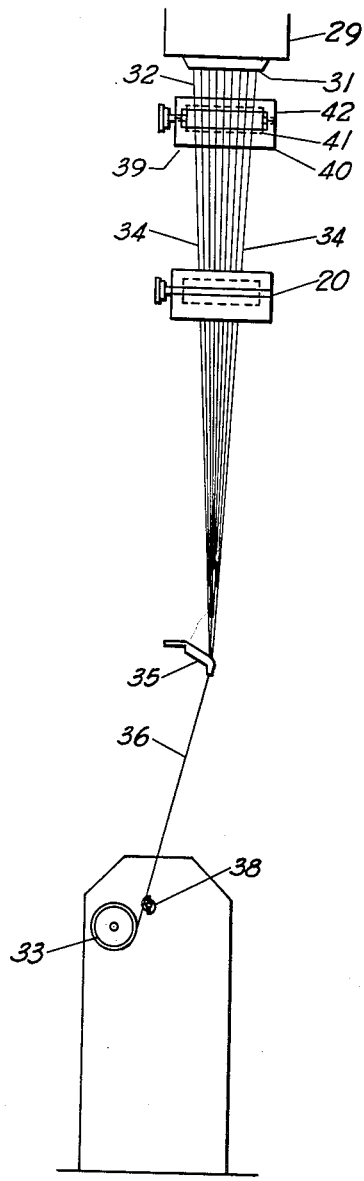
FIGURE 3 is a front elevational view of apparatus for applying the undercoat of metal in accordance with a second embodiment of the invention.

It has been discovered that metals and combinations of metals in any desired thickness may be applied to glass either in the massive or fibrous form. By the use of the fiber coating apparatus shown, it is possible to apply a relatively low melting point metal as an undercoat or inner layer and over this undercoat a coating of a metal which has greater hardness and resistance to wear, abrasion, and corrosion, or good surface characteristics and the like. Undercoating metals which have melting points of from about 100° to 1500° F. or preferably from 400° to 1400° F. or more, include tin, bismuth, cadmium, lead, zinc, indium, antimony, magnesium, aluminum and alloys of these metals including lead-tin, zinc-tin, zinc-aluminum and other alloys and the overcoating metals are preferably metals such as stainless steel, copper, iron, brass, chromium, silver, cadmium, indium, nickel and the like.

In carrying out this invention, a surface of a piece of glass is brought in contact with molten metal to coat the face of glass with metal. This metal coated surface is then used as the cathode in an electroplating circuit to coat the metal surface with any other desired metal or with the same metal to increase the thickness of the metal coat or to enhance further the physical properties of the product. For instance, a single fiber of glass is coated with a metal as by pulling the fiber, preferably as it is being formed, through a bead of molten metal having a relatively low melting point and then this metal coated fiber is treated by electroplating methods to apply a second metal of greater hardness or durability to further enhance the properties of the fiber, as may be desired. Furthermore, the surface of a piece of glass may be metalized after a conductive coating, such as graphite, is applied to the glass surface. Specific embodiments of the invention will be set forth, however, the invention is not to be limited thereto.

When applying an initial coat of molten metal to fibrous glass as it is being formed, it has been found advantageous to have the application of metal take place without reheating of the glass; however, glass in the massive form is purposely heated or reheated and then wiped with the molten metal or the metal is applied in any other suitable manner without deleteriously affecting the physical properties of the glass.

Any suitable glass composition is used in manufacturing the fibrous or massive form articles to be coated. Non-alkaline glass compositions such as those of Schoenlaub's United States Patent 2,334,961 and Tiede's United States Patent 2,571,074 are suitable for producing fibrous glass for the purposes of the invention. It has been discovered that adding proportions of cobalt, titanium and other metal oxides to glass compositions improves the adhesion of metal to the glass.

In one embodiment of the invention, a multiplicity of continuous filaments are coated with a metallic undercoat using the apparatus shown in FIGURES 1 and 2. This apparatus comprises a metal applicator 23 which supplies molten metal in a horizontal bead through which the fibers are drawn and substantially coated with metal. Fibrous glass is formed by supplying molten glass to a feeder 10 provided with a multiplicity of outlets 11 in its bottom, from which flow a plurality of streams of molten glass 12. The outlets are arranged in one or more rows so that the streams of glass are all substantially in the same plane. As the streams flow downwardly from outlets 11 they are attenuated into fibers 13 by the action of pulling wheels 14, 14. Aftere passing over roll applicator 20 which applies a lubricant, the individual fibers 13, 13 are gathered together in the form of a strand 15 by the action of the gathering roll 16. The driven strand 17 from the pulling wheels 14, 14 impinges upon pins 18, 18 of the traversing device 19 forming loops 21 in the strand. These loops 21, 21 are directed into a container 22 by the action of the rotating traverse member 19. The loops form a loose package from which the strand can easily be withdrawn. The package so formed may be removed as such from the container or it may remain in the container for the electroplating treatments.

Immediately adjacent the feeder 10 is a metal applicator 23 adapted for melting a metal and supplying it in the form of a molten bead 24 disposed in a horizontal slot in the metal coating face 25 of the applicator 23. The metal in the applicator 23 is maintained molten by heating the unit with an electrical resistance element comprising conductors 26, 26 embedded with an electrical insulation layer such as refractory, cement or silicate fibers. The heating unit is provided with external terminals for connection to a suitable power source. The metal may be maintained molten within a range of temperatures, the particular operating temperature generally not being critical. The metal applicator is provided with adjusting means for positioning the applicator in respect to the feeder 10 and the outlets 11 of the feeder. The cranks 27 and 28 allow adjustments both horizontally and vertically to move the metal applicator and the bead of metal 24 into and out of operating position. The gathering roll 16 preferably is made of a material such as graphite or Teflon or any suitable material which does not abrade the metal coated fibers. A free turning wheel journalled upon ball bearings or the like is satisfactory or the wheel may be turned with an electric motor so that a new surface is presented continually to prevent undue wear or grooving. Before the individual fibers 13 are drawn together in the form of a strand 15, it is desirable to apply a suitable size, lubricant or other treatment. It is possible to use a suitable size comprising the conventional materials such as starch, gelatin or the like or a lubricant may be used to improve handleability of the strand.

If water or water soluble lubricants are applied, then no cleaning of the strand is necessary before plating; however, materials which are oily or non-conductive should be removed before plating. Suitable water soluble lubricants are such materials as the polyalkylene glycol derivatives designated by Carbide and Carbon Chemicals Corporation as Ucon. Water alone is a sufficient lubricant and obviously is well adapted for use where electroplating steps follow the formation of the electroconductive glass package.

The pulling wheels are preferably provided with rubber treads which bear upon one another so that the strand 15 is snubbed therebetween and pulled downwardly with a resulting attenuation taking place in the streams 12 forming fibers 13.

The container 22 is either a paper bag, a bag formed of suitable fabric or composition material or the container can be a metal can or basket which is adapted for insertion in the electrolyte used in subsequent plating operations. If desired, the metal basket may be coated with a non-conductive material or a corrosion resistant material.

Figure 4:
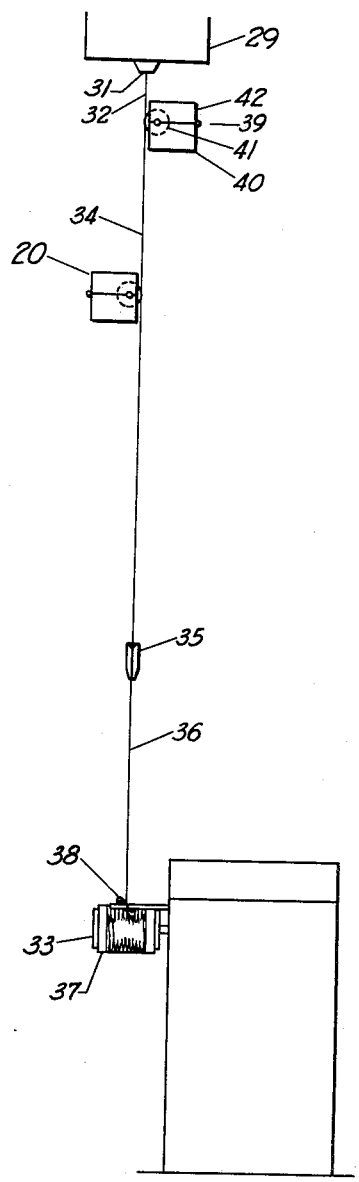
FIGURE 4 is a side elevational view of the apparatus shown in FIGURE 3.

Another method of applying the initial coat of metal to fibrous glass entails the use of the equipment shown in FIGURES 3 and 4 wherein the feeder 29 is again provided with a plurality of outlets 31 which form a number of streams 32 of glass which are drawn downwardly by the action of collet 33. The streams 32 of glass are attenuated into fibers 34 which are gathered together with a gathering shoe and pad 35 in the form of a strand 36 which is then wound upon a tube 37 on collet 33. The strand 36 is wound upon tube 37 when mounted upon collet 33 and is formed into a package which is rather tightly wound even though the strand is traversed from one side of the tube 37 to the other side by the action of the wires of traverse member 38. Immediately adjacent the feeder 29 and the outlets 31 thereof is disposed a metal applicator 39 comprising a reservoir tank 40, a transfer roll 41 and a hinged lid 42. The metal is maintained in a molten condition by the heat produced in an electrical resistance element disposed in the reservoir tank 40 in a manner somewhat similar to the arrangement in the applicator shown in FIGURE 1. The fibers 34 pass through a film of metal upon transfer roll 41 and are thereby coated with the metal. The metal coated fibers are preferably treated with water or a lubricant before being gathered into a strand to improve handleability of the strand in subsequent operations. The roll applicator 20 is used for applying water or such materials as a water soluble lubricant.

The package formed upon such a collet as shown in FIGURES 3 and 4 may be treated in their present form or they may be rewound into a thin loosely wound package 66 on perforated spool 65, see FIGURES 6 and 12. These thin packages are better adapted for coating with metal by immersion or electroplating methods since the electrolyte or solution can be pumped through the package. The electrolyte is pumped into the inlet at the bottom of the spool and passes through the perforations and through the package on the spool. With the package being the cathode, the strands are plated.

Furthermore, the package on tube 37 may be unwound and formed into preferred loose packages in a can or bag with the apparatus shown in FIGURE 5. The air gun 43 pulls the strand from the tube 37 through guide eye 44 and impinges the strand upon a pin traverse 45 which rotates and forms loops 46, helixes, or the like, depending on the configuration of the wire pins, which loops 46 are collected in a suitable container 47. Such a package makes it possible to obtain greater thicknesses of electrodeposited metal.

The products of the apparatus shown in FIGURES 1 and 2 or that shown in FIGURES 3 and 4 which have been reformed as a cone package or loose package in a bag or basket or products formed by other suitable apparatus may be further treated to apply greater thicknesses of the same metal or overcoats of a dissimilar metal having physical properties which enhance those of the product coated with a single metal. Likewise electroconductive glass composition articles are treated by the methods of the invention. These treatments include coating by immersion, electroplating, and the like.

In FIGURE 7 is shown apparatus suitable for electroplating metal coated glass in the form of a single fiber or strand or a loosely formed package of metal coated strand. A tank 51 contains a suitable electrolyte 52, anodes 53 of the metal to be plated, and a metal basket cathode 54 in which is disposed the package of strand coated with the initial metal, this package being designated by numeral 55. The anode may be a metal which is insoluble in the electrolyte; however, metal ions must be added in the form of salts of the metal or the like unless the metal in the electrolyte be depleted. Metal basket 54 is hung upon metal rod 56 which is electrically connected in such a manner that the metal basket and the metal coated package is the cathode.

When use is made of a fabric or paper bag instead of the electrically conductive metal container 47, a metal probe is introduced into the package of strand to effect the electrical connection. The metal basket and the probe, when used, will be plated with metal; however, this metal is removed electrically when necessary. A basket having a heavy deposit of metal may be used as the anode for controlled time periods in order to strip the deposit. A non-conductive basket may be used to support the non-conductive bag or sack filled with conductive glass. For instance, a metal container coated with highly plasticized polyvinyl chloride or the like may be used for such purposes. If desired, the fabric or paper bag is removed from the loosely formed package before it is inserted in the non-conductive basket for electroplating.

It is possible to coat the loosely formed packages throughout their entirety with the secondary metal by both electroplating and immersion methods. The innermost strands of the loose package are coated with the second metal as well as the outermost strands. Any ghosting effect due to the proximity of the individual fibers within a strand is negligible.

In FIGURE 8 is shown a setup for coating by immersion. In this apparatus a tank 48 is filled with a suitable solution 49 and the loosely formed packages comprising fibers already coated with metal are immersed and placed on rack 50. In this process, a metal displaces from its simple solutions another metal lower in the electromotive series, the metal higher in the electromotive series being deposited out on the metal coated fibers or strands. The basket is preferably coated with a corrosion resistant material or is manufactured from a metal that is not attacked by the solution used.

In FIGURE 9 apparatus for depositing metal upon bare fibrous glass is shown. The bare strand 58 from the tube or other package 57 is directed through a dip tank 59 containing a dispersion or solution of graphite. The graphite is dispersed in or made a solution with a suitable solvent such as trichloroethylene or carbon tetrachloride or a mixture of such solvents. A suitable wax may be added as desired to promote adherence of the graphite to the fibrous glass. The graphite coated strand is then wound upon a drum 61 to form a package 60. In the next step the strand is unrolled from package 60 and introduced into a plating tank 62 containing a suitable electrolyte 63 and one or more anodes 64 which may be the metal to be plated. The graphite coated strand is made the cathode by contacting a roll 68 which is connected in the electroplating circuit and the metal comprising the salt in the electrolyte is plated upon the graphite coated fiber. The resultant product is a metal coated fibrous glass article which is used as produced or further treated to add other coatings of like or dissimilar metals or suitable finishes.

The glass of the metal coated products may be removed by applying sufficient heat or the action of dissolving acids or other suitable materials to form very small diameter tubes of metal. For instance, chromium which melts at 2939° F. will remain after the glass is melted out at about 2100° F. to form a metal tube of fine diameter or a glass lined metal tube if only partial removal is effected.

The initial or secondary coating of metal is also applicable by introducing upon the glass a silver nitrate solution and then hydrazine sulfate followed by a washing step, as in a continuous method of treating fibers, to provide a coat of silver on the glass.

An initial conductive coating is also achieved by pulling hot glass in fibrous or other forms through a pot of tin chloride. The tin chloride is reduced by the heat of the glass to tin oxide which forms a conductive coating on the glass.

Double coated products provided by the methods of this invention comprising two-step metal coating processes are shown in FIGURES 10 and 11 with suitable legends.

Some of the specific metals and combinations of metals which are applied as primary and secondary coatings are as follows.

Example No. 1

Zinc is applied to a single filament or a plurality of filaments using the equipment shown in FIGURE 1 or FIGURE 3 of the drawings. The molten zinc is maintained at a temperature of from about 790° to 850° F. If a plurality of filaments are coated with zinc using the applicator shown, the filaments may be gathered together into the form of a strand after they are treated with a water soluble lubricant such as a polyalkylene glycol. This strand or filament, as the case may be, is then further treated by electrodepositing copper thereon. Since zinc is above copper in the electromotive series and the use of an acid copper bath results in a deposit by immersion, it is preferable that a cyanide copper solution be used at least initially. The alkaline copper solution used is essentially sodium cuprocyanide comprising a solution prepared by dissolving cuprocyanide in sodium cyanide or by dissolving basic copper carbonate in sodium cyanide. Enough copper is plated upon the zinc in the cyanide copper solution to provide a continuous coat and then if more copper is desirable, the zinc and copper coated product is introduced after proper washing into an acid copper bath comprising copper sulfate and sulfuric acid where the electroplating is continued. It is preferable to use batch methods in electroplating; however, a continuous process may be utilized by directing the strand or fiber which has been coated with the initial metal, such as zinc, over an electrical conductive roll which makes the strand or fiber the cathode in the electroplating circuit.

Example No. 2

An initial coat of zinc is placed upon the strand or fiber as in Example No. 1 and the product is then introduced into a nickel strike tank. The tendency for the nickel to be deposited by immersion is overcome by the use of an initial high current density. The high cathode potential should be equal to or greater than that with which the zinc tends to go into solution. After the initial strike at high current density, nickel is plated upon the fiber or strand to the desired thickness using an electrolyte of the single or double salt of nickel sulfate. Ammonium chloride is added to induce anode corrosion to overcome the effect of passivity which is an inherent property of nickel. The hydrogen ion concentration should be low so an acid such as boric acid is used to regulate the acidity, the nickel solutions usually being only slightly acid. The regulation of the acidity can also be obtained by use of tartaric or citric acids.

Example No. 3

Strands of fibrous glass are coated with the apparatus of FIGURE 1 or 3 in order to get an initial coat of zinc on the individual fibers. This zinc coated strand is then introduced into a nickel plating bath to strike with nickel at a high current density and then the strand is plated with chromium by introducing the strand into a chromium plating bath comprising chromic acid and sulfuric acid. The strand so treated has a very bright and hard finish even though the strand remains flexible and strong.

Example No. 4

A fibrous glass product is coated with zinc by using the apparatus of FIGURES 1 or 3 and this initial coat of zinc is then covered with an alloy of copper and zinc by introducing the zinc coated fibrous product into an electroplating tank having an electrolyte comprising copper cyanide, zinc cyanide and sodium cyanide. The brass coated strand has improved physical properties and is particularly adapted for combination with rubber for producing reinforced rubber articles including pneumatic tires, belts and the like.

*Example No. 5*

Strands of fibrous glass comprising zinc coated fibers are plated with silver by first striking the zinc coated fibrous strand with nickel and then introducing the product in a silver electroplating solution comprising potassium silver cyanide complex to effect the silver coating.

*Example No. 6*

Fibrous glass is coated with an initial layer of zinc and then the product is electroplated with copper using a copper cyanide electroplating bath. The copper coated fibrous product is then immersed in a mercuric cyanide solution to produce an amalgam of mercury and copper. The deposit of mercury produced on the copper by immersion is very adherent due to the tendency of mercury to form an alloy or amalgam with the copper.

*Example No. 7*

Zinc coated fibrous glass in strand form is introduced into an iron electroplating bath comprising ferrous chloride, calcium chloride and water. A fine grain iron deposit forms to provide a hard, wear resistant finish on the fibrous glass product.

*Example No. 8*

Fibrous glass which has been coated with a low melting point metal by methods of the invention including those achieved with the apparatus of FIGURES 1 and 3 is introduced into a vacuum chamber and stainless steel is deposited thereon using vaporization techniques. A thin coat of stainless steel enhances the physical properties by providing an improved abrasion resistance and greater tensile strength.

*Example No. 9*

To achieve decorative effects aluminum is deposited upon the fibrous glass using vaporization techniques and the aluminum coat then anodized to achieve the desired colors. The fibers to be coated with aluminum may be coated first with another metal to provide a flamboyant effect.

*Example No. 10*

A 97:3 zinc aluminum alloy is applied to the fibrous glass using the equipment of FIGURES 1 or 3 and over the resultant product is electroplated a deposit of nickel. Alloys consisting essentially of zinc have less tendency toward deposition by immersion, therefore, the nickel strike is not necessarily used. Either a nickel sulfate solution or a nickel ammonium sulfate electroplating solution may be used to provide the nickel coat. The zinc aluminum alloys do not oxidize to form a skin on the molten metal and as a result provide uniform initial coats. A 99:1 zinc aluminum alloy can be used also.

*Example No. 11*

Fibrous glass is coated with zinc by using the apparatus of FIGURE 1 and the resultant product is then electroplated with zinc utilizing a zinc sulfate electroplating bath in order to build up the thickness of the zinc coating to any desirable thickness. Such a method is especially adapted for providing relatively thick coats of metal upon glass. By use of such an expedient it is unnecessary to subject the fibers to the deleterious effects of heat in more than one, short, molten metal coating operation.

*Example No. 12*

An electroconductive glass either in massive or fibrous form may be plated without first applying a metal with a molten bead applicator or the like. A suitable conductive glass composition as disclosed by G. E. Rindone in Vol. 37, No. 176, June 1953 Journal of The Society of Glass Technology, see pages 124T to 128T, is as follows:

| Ingredient: | Wt., percent |
| --- | --- |
| $Ag_2O$ | 5 to 60 |
| $B_2O_3$ | 30 to 85 |
| $SiO_2$ | 0 to 60 |
| $Al_2O_3$ | 0 to 20 |

This glass has a silver coat formed at its surface which coat is conductive. This glass is electroplated with silver using a double cyanide of silver and potassium as the electrolyte. Any desired thickness of silver can be attained by using such a method.

*Example No. 13*

A strand of fibrous glass is introduced into a thoroughly mixed dispersion of powdered graphite in trichloroethylene containing dissolved beeswax and after removal is allowed to air dry. The coating of graphite left on the strand provides an electroconductive surface which is plated with copper in an acid copper bath. The resulting product is especially adapted for electrical conductors in radio and electronic circuits or for producing transmission line cables or the like and also is a suitable reinforcement for rubber and resin articles.

*Example No. 14*

With the apparatus of FIGURES 1 or 3 a coating of metal having a melting point of from 100° to 1500° F is applied to a fiber of glass. Alloys representing the lower end of the range are Wood's or Rose's alloy and aluminum and magnesium represent the upper range of melting points. The metal coated fiber is then introduced into a suitable electroplating bath to deposit thereon a metal from the group consisting of copper, indium, iron, brass, chromium, nickel, cadmium and silver.

Although zinc has appeared as the initial coating metal in many of the examples, it should be understood that any other metal or alloy having melting points of from about 100° to 1500° F. may be used and preferably those having from 400° to 1400° F. melting point temperatures are used. Suitable metals include zinc, tin, bismuth, cadmium, lead, antimony, magnesium, aluminum and alloys of these metals such as zinc-aluminum, lead-tin, zinc-tin, Rose's alloy, Wood's alloy and the like.

Good surface characteristics are obtainable by plating indium on the outside of the metal coated fiber. By a subsequent heat treating step, the indium which melts at 311° F. will flow to provide an extremely smooth surface. Flow of the indium takes place at low temperatures which will not affect the strength of the glass. Indium may be applied as the second or third coating metal as may be desired.

Metal coated glass in the massive form or in the form of fibers, strands, yarns and like textile products produced by the apparatus and methods of the invention may be used in many products including the following: mirrors; reflecting surfaces; decorative materials; decorative fabrics; tapes; fishing lines; awnings; upholstery material; roofs; reinforced resins; movie screens; clothing; clutch facings; reinforcing cords for rubber products, including tires, garden hose, fire hose, conveyor belts, blankets, fan belts, motor belts, erasers, rug paddings, gloves, oxidizable material in flash bulbs, conductors in electrical circuits, radio, television and electronic equipment, radiation shields, protective wrappings in the form of foil or fabric, laminated products comprising thin foils of glass and metal, heating elements and resinous table tops and the like, and many more.

Obvious modifications and variations may be made within the spirit and scope of the appended claims.

We claim:

1. Glass fibers coated with a high melting point metal comprising fibers having an inner coating of a metal which has a melting point of from about 100° F. to about 1500° F. selected from the group consisting of tin, bismuth, cadmium, lead, zinc, indium, antimony, magnesium, aluminum and alloys of these, and an outer electrodeposited metallic coating having a melting point greater than that of the inner coating metal, the outer coating being one selected from the group consisting of stainless steel, copper, iron, brass, chromium, silver, cadmium, indium and nickel.

2. Coated glass fibers of claim 1 wherein the inner coating comprises zinc and the outer coating comprises copper.

3. Coated glass fibers of claim 1 wherein the inner coating is zinc and the outer coating is brass.

4. Coated glass fibers of claim 1 wherein the inner coating is zinc and the outer coating is nickel.

5. Coated glass fibers of claim 1 wherein the inner coating is zinc and the outer coating is chromium.

References Cited in the file of this patent

UNITED STATES PATENTS

| | | |
|---|---|---|
| 2,405,662 | McManus | Aug. 13, 1946 |
| 2,562,182 | Godley | July 31, 1951 |
| 2,698,812 | Schladitz | Jan. 4, 1955 |
| 2,699,415 | Nachtman | Jan. 11, 1955 |
| 2,772,518 | Whitehurst | Dec. 4, 1956 |
| 2,791,515 | Nack | May 7, 1957 |
| 2,848,390 | Whitehurst | Aug. 19, 1958 |